US009111278B1

(12) United States Patent
Barton et al.

(10) Patent No.: US 9,111,278 B1
(45) Date of Patent: Aug. 18, 2015

(54) METHOD AND SYSTEM FOR DETERMINING POINT OF SALE AUTHORIZATION

(71) Applicant: JPMorgan Chase Bank, N.A., New York, NY (US)

(72) Inventors: Thomas C. Barton, Newark, DE (US); Harold Paulson, Chadds Ford, PA (US); Elizabeth Pierce Varhus, Wilmington, DE (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 14/047,272

(22) Filed: Oct. 7, 2013

Related U.S. Application Data

(63) Continuation of application No. 12/966,213, filed on Dec. 13, 2010, now Pat. No. 8,554,631.

(60) Provisional application No. 61/360,960, filed on Jul. 2, 2010.

(51) Int. Cl.
 G06Q 20/00 (2012.01)
 G06Q 20/40 (2012.01)
(52) U.S. Cl.
 CPC .................. *G06Q 20/4016* (2013.01)
(58) Field of Classification Search
 CPC .................. G06Q 20/20; G07G 1/12
 USPC ........................................... 705/16
 See application file for complete search history.

(56) References Cited

U.S. PATENT DOCUMENTS

| 4,223,403 A | 9/1980 | Konheim et al. |
| 4,319,336 A | 3/1982 | Andersen et al. |

(Continued)

FOREIGN PATENT DOCUMENTS

| JP | 7-152960 | 6/1995 |
| JP | 2007-088822 | 4/2007 |
| WO | 01/86524 | 11/2001 |

OTHER PUBLICATIONS

Delivering the Right Information to the Right Resource or Every Customer Interaction Intelligent Callrouter, www.geotel.com/solutions/icr/default/htm, 1998, 1 page.

(Continued)

*Primary Examiner* — Seye Iwarere
(74) *Attorney, Agent, or Firm* — Hunton & Williams LLP (57) ABSTRACT

According to an embodiment of the present invention, an automated computer implemented method and system for determining authorization for a point of sale transaction, wherein the method is executed by a programmed computer processor which communicates with a user via a communication network comprising receiving a point of sale authorization request for a transaction from a customer at a merchant, via a communication network; accessing profile data associated with one or more of the customer, an account associated with the customer and the merchant involved in the transaction; applying one or more rules to the authorization request wherein the one or more rules comprises one or more of credit rules and fraud rules; applying one or more scoring algorithm to the authorization request wherein the one or more scoring algorithm indicates an assessment of risk; determining an authorization response, via a programmed computer processor, based at least in part on a combination of profile data, the one or more applied rules and the one or more applied scoring algorithms; providing the authorization response for the transaction via the communication network.

16 Claims, 2 Drawing Sheets

(56) References Cited

U.S. PATENT DOCUMENTS

| | | |
|---|---|---|
| 4,321,672 A | 3/1982 | Braun et al. |
| 4,355,372 A | 10/1982 | Goldberg |
| 4,491,725 A | 1/1985 | Pritchard |
| 4,495,018 A | 1/1985 | Vohrer |
| 4,605,820 A | 8/1986 | Campbell, Jr. |
| 4,633,397 A | 12/1986 | Macco |
| 4,641,239 A | 2/1987 | Takesako |
| 4,661,658 A | 4/1987 | Matyas |
| 4,694,397 A | 9/1987 | Grant et al. |
| 4,713,760 A | 12/1987 | Yamada et al. |
| 4,722,054 A | 1/1988 | Fukushima |
| 4,745,468 A | 5/1988 | Von Kohorn |
| 4,752,676 A | 6/1988 | Leonard et al. |
| 4,752,877 A | 6/1988 | Roberts et al. |
| 4,774,664 A | 9/1988 | Gottardy |
| 4,797,911 A | 1/1989 | Marks |
| 4,812,628 A | 3/1989 | Boston et al. |
| 4,877,947 A | 10/1989 | Mori et al. |
| 4,891,503 A | 1/1990 | Jewell |
| 4,914,587 A | 4/1990 | Clouse |
| 4,926,255 A | 5/1990 | Von Kohorn |
| 4,932,046 A | 6/1990 | Ross |
| 4,948,174 A | 8/1990 | Thomson et al. |
| 4,972,504 A | 11/1990 | Daniel, Jr. |
| 4,974,878 A | 12/1990 | Josephson |
| 5,023,782 A | 6/1991 | Lutz et al. |
| 5,025,372 A | 6/1991 | Burton et al. |
| 5,041,972 A | 8/1991 | Frost |
| 5,050,207 A | 9/1991 | Hitchcock |
| 5,056,019 A | 10/1991 | Schultz et al. |
| 5,121,945 A | 6/1992 | Thomson et al. |
| 5,122,950 A | 6/1992 | Mee |
| 5,157,717 A | 10/1992 | Hitchcock |
| 5,175,682 A | 12/1992 | Higashiyama |
| 5,179,584 A | 1/1993 | Tsumura |
| 5,220,501 A | 6/1993 | Lawlor |
| 5,225,978 A | 7/1993 | Peterson |
| 5,231,569 A | 7/1993 | Myatt et al. |
| 5,237,620 A | 8/1993 | Deaton |
| 5,239,642 A | 8/1993 | Gutierrez et al. |
| 5,259,023 A | 11/1993 | Katz |
| 5,260,778 A | 11/1993 | Kauffman |
| 5,262,941 A | 11/1993 | Saladin |
| 5,265,008 A | 11/1993 | Benton et al. |
| 5,287,269 A | 2/1994 | Dorrough et al. |
| 5,311,594 A | 5/1994 | Penzias |
| 5,326,959 A | 7/1994 | Perazza |
| 5,361,201 A | 11/1994 | Jost et al. |
| 5,383,113 A | 1/1995 | Knight |
| 5,402,474 A | 3/1995 | Miller |
| 5,424,938 A | 6/1995 | Wagner |
| 5,428,684 A | 6/1995 | Akiyama et al. |
| 5,430,644 A | 7/1995 | Deaton et al. |
| 5,448,471 A | 9/1995 | Deaton et al. |
| 5,465,206 A | 11/1995 | Hilt et al. |
| 5,483,444 A | 1/1996 | Heintzeman et al. |
| 5,483,445 A | 1/1996 | Pickering |
| 5,490,060 A | 2/1996 | Malec |
| 5,500,890 A | 3/1996 | Rogge et al. |
| 5,513,102 A | 4/1996 | Auriemma |
| 5,523,942 A | 6/1996 | Tyler |
| 5,532,920 A | 7/1996 | Hartrick |
| 5,537,314 A | 7/1996 | Kanter |
| 5,539,825 A | 7/1996 | Akiyama et al. |
| 5,550,734 A | 8/1996 | Tater |
| 5,555,299 A | 9/1996 | Maloney et al. |
| 5,559,855 A | 9/1996 | Dowens et al. |
| 5,561,707 A | 10/1996 | Katz |
| 5,570,465 A | 10/1996 | Tsakanikas |
| 5,583,759 A | 12/1996 | Geer |
| 5,594,791 A | 1/1997 | Szlam et al. |
| 5,599,528 A | 2/1997 | Igaki |
| 5,615,341 A | 3/1997 | Srikant |
| 5,621,812 A | 4/1997 | Deaton et al. |
| 5,631,828 A | 5/1997 | Hagan |
| 5,638,457 A | 6/1997 | Deaton et al. |
| 5,642,485 A | 6/1997 | Deaton et al. |
| 5,644,723 A | 7/1997 | Deaton et al. |
| 5,649,114 A | 7/1997 | Deaton et al. |
| 5,652,786 A | 7/1997 | Rogers |
| 5,659,165 A | 8/1997 | Jennings |
| 5,659,469 A | 8/1997 | Deaton et al. |
| 5,684,863 A | 11/1997 | Katz |
| 5,687,322 A | 11/1997 | Deaton et al. |
| 5,689,100 A | 11/1997 | Carrithers et al. |
| 5,699,527 A | 12/1997 | Davidson |
| 5,699,528 A | 12/1997 | Hogan |
| 5,704,044 A | 12/1997 | Tarter et al. |
| 5,710,889 A | 1/1998 | Clark et al. |
| 5,715,298 A | 2/1998 | Rogers |
| 5,715,450 A | 2/1998 | Ambrose |
| 5,727,153 A | 3/1998 | Powell |
| 5,734,838 A | 3/1998 | Robinson et al. |
| 5,742,775 A | 4/1998 | King |
| 5,745,706 A | 4/1998 | Wolfberg et al. |
| 5,757,904 A | 5/1998 | Anderson |
| 5,758,126 A | 5/1998 | Daniels et al. |
| 5,761,647 A | 6/1998 | Boushy |
| 5,765,142 A | 6/1998 | Allred et al. |
| 5,787,403 A | 7/1998 | Randle |
| 5,793,846 A | 8/1998 | Katz |
| 5,794,221 A | 8/1998 | Egendorf |
| 5,802,498 A | 9/1998 | Comesanas |
| 5,802,499 A | 9/1998 | Sampson et al. |
| 5,815,551 A | 9/1998 | Katz |
| 5,819,238 A | 10/1998 | Fernholz |
| 5,826,241 A | 10/1998 | Stein |
| 5,832,447 A | 11/1998 | Rieker |
| 5,832,457 A | 11/1998 | O'Brien |
| 5,832,460 A | 11/1998 | Bednar |
| 5,835,087 A | 11/1998 | Herz |
| 5,835,580 A | 11/1998 | Fraser |
| 5,835,603 A | 11/1998 | Coutts |
| 5,842,211 A | 11/1998 | Horadan |
| 5,842,421 A | 12/1998 | Desilets et al. |
| 5,852,811 A | 12/1998 | Atkins |
| 5,862,223 A | 1/1999 | Walker |
| 5,870,456 A | 2/1999 | Rogers |
| 5,870,721 A | 2/1999 | Norris |
| 5,870,724 A | 2/1999 | Lawlor |
| 5,873,072 A | 2/1999 | Kight |
| 5,875,437 A | 2/1999 | Atkins |
| 5,884,032 A | 3/1999 | Bateman |
| 5,884,288 A | 3/1999 | Chang |
| 5,890,140 A | 3/1999 | Clark et al. |
| 5,897,625 A | 4/1999 | Gustin |
| 5,899,982 A | 5/1999 | Randle |
| 5,903,881 A | 5/1999 | Schrader |
| 5,920,847 A | 7/1999 | Kolling et al. |
| 5,923,745 A | 7/1999 | Hurd |
| 5,933,812 A | 8/1999 | Meyer et al. |
| 5,940,811 A | 8/1999 | Norris |
| 5,943,656 A | 8/1999 | Crooks |
| 5,949,044 A | 9/1999 | Walker et al. |
| 5,953,406 A | 9/1999 | LaRue et al. |
| 5,966,695 A | 10/1999 | Melchione et al. |
| 5,966,698 A | 10/1999 | Pollin |
| 5,970,467 A | 10/1999 | Alavi |
| 5,970,480 A | 10/1999 | Kalina |
| 5,974,396 A | 10/1999 | Anderson |
| 5,978,780 A | 11/1999 | Watson |
| 5,987,434 A | 11/1999 | Libman |
| 5,987,435 A | 11/1999 | Weiss et al. |
| 5,991,736 A | 11/1999 | Ferguson et al. |
| 5,991,750 A | 11/1999 | Watson |
| 5,995,942 A | 11/1999 | Smith et al. |
| 5,995,948 A | 11/1999 | Whitford |
| 6,006,205 A | 12/1999 | Loeb et al. |
| 6,006,207 A | 12/1999 | Mumick et al. |
| 6,009,411 A | 12/1999 | Kepecs |
| 6,009,415 A | 12/1999 | Shurling et al. |
| 6,012,049 A | 1/2000 | Kawan |
| 6,016,344 A | 1/2000 | Katz |
| 6,016,482 A | 1/2000 | Molinari et al. |

(56) References Cited

U.S. PATENT DOCUMENTS

| | | |
|---|---|---|
| 6,018,718 A | 1/2000 | Walker et al. |
| 6,018,722 A | 1/2000 | Ray et al. |
| 6,026,370 A | 2/2000 | Jermyn |
| 6,029,139 A | 2/2000 | Cunningham et al. |
| 6,029,153 A | 2/2000 | Bauchner et al. |
| 6,032,125 A | 2/2000 | Ando |
| 6,032,136 A | 2/2000 | Brake, Jr. et al. |
| 6,038,552 A | 3/2000 | Fleischl et al. |
| 6,049,782 A | 4/2000 | Gottesman et al. |
| 6,055,510 A | 4/2000 | Henrick |
| 6,058,378 A | 5/2000 | Clark et al. |
| 6,067,533 A | 5/2000 | McCauley et al. |
| 6,070,147 A | 5/2000 | Harms et al. |
| 6,076,072 A | 6/2000 | Libman |
| 6,078,892 A | 6/2000 | Anderson et al. |
| 6,088,685 A | 7/2000 | Kiron et al. |
| 6,098,052 A | 8/2000 | Kosiba et al. |
| 6,100,891 A | 8/2000 | Thorne |
| 6,101,486 A | 8/2000 | Roberts et al. |
| 6,105,007 A | 8/2000 | Norris |
| 6,108,642 A | 8/2000 | Findley |
| 6,112,190 A | 8/2000 | Fletcher et al. |
| 6,119,933 A | 9/2000 | Wong et al. |
| 6,128,599 A | 10/2000 | Walker et al. |
| 6,134,563 A | 10/2000 | Clancey et al. |
| 6,141,666 A | 10/2000 | Tobin |
| 6,148,293 A | 11/2000 | King |
| 6,151,584 A | 11/2000 | Papierniak et al. |
| 6,157,924 A | 12/2000 | Austin |
| 6,169,974 B1 | 1/2001 | Baumgartner et al. |
| 6,178,408 B1 | 1/2001 | Copple et al. |
| 6,182,059 B1 | 1/2001 | Angotti et al. |
| 6,189,787 B1 | 2/2001 | Dorf |
| 6,195,644 B1 | 2/2001 | Bowie |
| 6,212,178 B1 | 4/2001 | Beck et al. |
| 6,222,914 B1 | 4/2001 | McMullin |
| 6,226,623 B1 | 5/2001 | Schein et al. |
| 6,230,287 B1 | 5/2001 | Pinard et al. |
| 6,233,332 B1 | 5/2001 | Anderson et al. |
| 6,233,566 B1 | 5/2001 | Levine et al. |
| 6,243,688 B1 | 6/2001 | Kalina |
| 6,243,689 B1 | 6/2001 | Norton |
| 6,254,000 B1 | 7/2001 | Degen et al. |
| 6,267,292 B1 | 7/2001 | Walker et al. |
| 6,278,981 B1 | 8/2001 | Dembo et al. |
| 6,278,996 B1 | 8/2001 | Richardson et al. |
| 6,289,324 B1 | 9/2001 | Kawan |
| 6,292,786 B1 | 9/2001 | Deaton et al. |
| 6,292,789 B1 | 9/2001 | Schutzer |
| 6,301,567 B1 | 10/2001 | Leong et al. |
| 6,304,653 B1 | 10/2001 | O'Neil et al. |
| 6,304,858 B1 | 10/2001 | Mosler et al. |
| 6,321,212 B1 | 11/2001 | Lange |
| 6,324,524 B1 | 11/2001 | Lent et al. |
| 6,327,573 B1 | 12/2001 | Walker et al. |
| 6,330,543 B1 | 12/2001 | Kepecs |
| 6,332,126 B1 | 12/2001 | Peirce et al. |
| 6,334,108 B1 | 12/2001 | Deaton et al. |
| 6,338,047 B1 | 1/2002 | Wallman |
| 6,349,290 B1 | 2/2002 | Horowitz et al. |
| 6,356,881 B1 | 3/2002 | Milch et al. |
| 6,360,209 B1 | 3/2002 | Loeb et al. |
| 6,385,594 B1 | 5/2002 | Lebda et al. |
| 6,393,409 B2 | 5/2002 | Young et al. |
| 6,404,866 B1 | 6/2002 | Hopper et al. |
| 6,405,175 B1 | 6/2002 | Ng |
| 6,405,179 B1 | 6/2002 | Rebane |
| 6,405,181 B2 | 6/2002 | Lent et al. |
| 6,409,080 B2 | 6/2002 | Kawagishi |
| 6,411,947 B1 | 6/2002 | Rice et al. |
| 6,415,267 B1 | 7/2002 | Hagan |
| 6,418,419 B1 | 7/2002 | Nieboer et al. |
| 6,424,947 B1 | 7/2002 | Tsuria et al. |
| 6,424,949 B1 | 7/2002 | Deaton et al. |
| 6,424,951 B1 | 7/2002 | Shurling et al. |
| 6,430,545 B1 | 8/2002 | Honarvar et al. |
| 6,434,534 B1 | 8/2002 | Walker et al. |
| 6,456,983 B1 | 9/2002 | Keyes et al. |
| 6,480,850 B1 | 11/2002 | Veldhuisen |
| 6,513,019 B2 | 1/2003 | Lewis |
| 6,516,302 B1 | 2/2003 | Deaton et al. |
| 6,553,113 B1 | 4/2003 | Dhir et al. |
| 6,564,189 B1 | 5/2003 | Nycz |
| 6,567,791 B2 | 5/2003 | Lent et al. |
| 6,571,216 B1 | 5/2003 | Garg et al. |
| 6,578,012 B1 | 6/2003 | Storey |
| 6,578,015 B1 | 6/2003 | Haseltine et al. |
| 6,594,640 B1 | 7/2003 | Postrel |
| 6,606,744 B1 | 8/2003 | Mikurak |
| 6,609,104 B1 | 8/2003 | Deaton et al. |
| 6,609,113 B1 | 8/2003 | O'Leary et al. |
| 6,611,811 B1 | 8/2003 | Deaton et al. |
| 6,611,819 B1 | 8/2003 | Oneda |
| 6,647,376 B1 | 11/2003 | Farrar et al. |
| 6,658,393 B1 | 12/2003 | Basch et al. |
| 6,662,215 B1 | 12/2003 | Moskowitz et al. |
| 6,684,195 B1 | 1/2004 | Deaton et al. |
| 6,704,714 B1 | 3/2004 | O'Leary et al. |
| 6,714,919 B1 | 3/2004 | Findley |
| 6,718,313 B1 | 4/2004 | Lent et al. |
| 6,721,743 B1 | 4/2004 | Sakakibara |
| 6,754,640 B2 | 6/2004 | Bozeman |
| 6,795,809 B2 | 9/2004 | O'Brien et al. |
| 6,795,812 B1 | 9/2004 | Lent et al. |
| 6,804,346 B1 | 10/2004 | Mewhinney |
| 6,804,786 B1 | 10/2004 | Chamley et al. |
| 6,817,008 B2 | 11/2004 | Ledford et al. |
| 6,819,748 B2 | 11/2004 | Weiss et al. |
| 6,820,061 B2 | 11/2004 | Postrel |
| 6,823,319 B1 | 11/2004 | Lynch et al. |
| 6,829,586 B2 | 12/2004 | Postrel |
| 6,842,739 B2 | 1/2005 | Postrel |
| RE38,717 E | 3/2005 | Bothwell |
| 6,865,547 B1 | 3/2005 | Brake, Jr. et al. |
| 6,874,139 B2 | 3/2005 | Krueger et al. |
| 6,889,198 B2 | 5/2005 | Kawan |
| 6,901,375 B2 | 5/2005 | Fernandez |
| 6,901,406 B2 | 5/2005 | Nabe et al. |
| 6,915,271 B1 | 7/2005 | Meyer et al. |
| 6,920,611 B1 | 7/2005 | Spaeth et al. |
| 6,938,156 B2 | 8/2005 | Wheeler et al. |
| RE38,801 E | 9/2005 | Rogers |
| 6,947,898 B2 | 9/2005 | Postrel |
| 6,950,940 B2 | 9/2005 | Wheeler et al. |
| 6,963,857 B1 | 11/2005 | Johnson |
| 6,968,319 B1 | 11/2005 | Remington et al. |
| 6,970,830 B1 | 11/2005 | Samra et al. |
| 6,985,879 B2 | 1/2006 | Walker et al. |
| 6,988,082 B1 | 1/2006 | Williams et al. |
| 6,999,938 B1 | 2/2006 | Libman |
| 7,003,476 B1 | 2/2006 | Samra et al. |
| 7,006,979 B1 | 2/2006 | Samra et al. |
| 7,010,495 B1 | 3/2006 | Samra et al. |
| 7,068,832 B1 | 6/2006 | Price et al. |
| 7,072,864 B2 | 7/2006 | Brake, Jr. et al. |
| 7,090,138 B2 | 8/2006 | Rettenmyer et al. |
| 7,092,905 B2 | 8/2006 | Behrenbrinker et al. |
| 7,113,914 B1 | 9/2006 | Spielmann et al. |
| 7,121,471 B2 | 10/2006 | Beenau et al. |
| 7,139,729 B2 | 11/2006 | Nault |
| 7,143,063 B2 | 11/2006 | Lent et al. |
| 7,174,302 B2 | 2/2007 | Patricelli et al. |
| 7,206,768 B1 | 4/2007 | deGroeve et al. |
| 7,234,065 B2 | 6/2007 | Breslin et al. |
| 7,249,097 B2 | 7/2007 | Hutchison et al. |
| 7,249,099 B2 | 7/2007 | Ling |
| 7,310,618 B2 | 12/2007 | Libman |
| 7,333,948 B2 | 2/2008 | Bell et al. |
| 7,349,866 B2 | 3/2008 | Schwarz, Jr. |
| 7,356,516 B2 | 4/2008 | Richey et al. |
| 7,406,426 B1 | 7/2008 | Pletz et al. |
| 7,428,531 B2 | 9/2008 | Barron et al. |
| 7,433,829 B2 | 10/2008 | Borgia et al. |
| 7,467,096 B2 | 12/2008 | Antonucci et al. |

(56) References Cited

U.S. PATENT DOCUMENTS

| | | |
|---|---|---|
| 7,505,918 B1 | 3/2009 | Spielmann et al. |
| 7,523,385 B2 | 4/2009 | Nguyen et al. |
| 7,536,433 B2 | 5/2009 | Reilly |
| 7,580,857 B2 | 8/2009 | VanFleet et al. |
| 7,580,890 B2 | 8/2009 | Siegel et al. |
| 7,587,363 B2 | 9/2009 | Cataline et al. |
| 7,603,283 B1 | 10/2009 | Spielmann et al. |
| 7,613,629 B2 | 11/2009 | Antonucci et al. |
| 7,630,935 B2 | 12/2009 | Loeger et al. |
| 7,637,425 B2 | 12/2009 | Mock et al. |
| 7,640,205 B2 | 12/2009 | Michelassi et al. |
| 7,689,504 B2 | 3/2010 | Warren et al. |
| 7,689,506 B2 | 3/2010 | Fei et al. |
| 7,707,089 B1 | 4/2010 | Barton et al. |
| 7,707,111 B2 | 4/2010 | Brake, Jr. et al. |
| 7,729,925 B2 | 6/2010 | Maritzen et al. |
| 7,729,980 B2 | 6/2010 | Mittenzwei et al. |
| 7,809,595 B2 | 10/2010 | Breslin et al. |
| 7,814,005 B2 | 10/2010 | Imrey et al. |
| 7,848,978 B2 | 12/2010 | Imrey et al. |
| 8,554,631 B1* | 10/2013 | Barton et al. ............... 705/16 |
| 2001/0023407 A1 | 9/2001 | Liyanearachchi et al. |
| 2001/0025253 A1 | 9/2001 | Heintz et al. |
| 2001/0029490 A1 | 10/2001 | Inamochi |
| 2001/0032158 A1 | 10/2001 | Starkman |
| 2001/0032159 A1 | 10/2001 | Starkman |
| 2001/0032176 A1 | 10/2001 | Starkman |
| 2001/0034651 A1 | 10/2001 | Marks et al. |
| 2001/0034663 A1 | 10/2001 | Teveler et al. |
| 2001/0034682 A1 | 10/2001 | Knight et al. |
| 2001/0034718 A1 | 10/2001 | Shaked et al. |
| 2001/0037243 A1 | 11/2001 | Rouston et al. |
| 2001/0037299 A1 | 11/2001 | Nichols et al. |
| 2001/0039511 A1 | 11/2001 | Duckworth et al. |
| 2001/0042034 A1 | 11/2001 | Elliott |
| 2001/0044293 A1 | 11/2001 | Morgan |
| 2001/0044764 A1 | 11/2001 | Arnold |
| 2001/0047342 A1 | 11/2001 | Cuervo |
| 2001/0047489 A1 | 11/2001 | Ito et al. |
| 2001/0049628 A1 | 12/2001 | Icho |
| 2001/0051920 A1* | 12/2001 | Joao et al. ............... 705/41 |
| 2001/0054003 A1 | 12/2001 | Chien et al. |
| 2001/0056390 A1 | 12/2001 | Varadarajan et al. |
| 2002/0002495 A1 | 1/2002 | Ullman |
| 2002/0004742 A1 | 1/2002 | Willcocks et al. |
| 2002/0007313 A1 | 1/2002 | Mai et al. |
| 2002/0010621 A1 | 1/2002 | Bell et al. |
| 2002/0011517 A1 | 1/2002 | Namekawa et al. |
| 2002/0023217 A1* | 2/2002 | Wheeler et al. ............... 713/171 |
| 2002/0026365 A1 | 2/2002 | Natanzon |
| 2002/0026394 A1 | 2/2002 | Savage et al. |
| 2002/0032622 A1 | 3/2002 | Petit et al. |
| 2002/0040344 A1 | 4/2002 | Preiser et al. |
| 2002/0042742 A1 | 4/2002 | Glover et al. |
| 2002/0042774 A1 | 4/2002 | Ortiz et al. |
| 2002/0046110 A1 | 4/2002 | Gallagher |
| 2002/0046116 A1 | 4/2002 | Hohle et al. |
| 2002/0046169 A1* | 4/2002 | Keresman et al. ............... 705/41 |
| 2002/0049605 A1 | 4/2002 | Hagi |
| 2002/0052778 A1 | 5/2002 | Murphy et al. |
| 2002/0055874 A1 | 5/2002 | Cohen |
| 2002/0059103 A1 | 5/2002 | Anderson et al. |
| 2002/0059141 A1 | 5/2002 | Davies et al. |
| 2002/0062253 A1 | 5/2002 | Dosh et al. |
| 2002/0062257 A1 | 5/2002 | Minamishin et al. |
| 2002/0065735 A1 | 5/2002 | Hatakama et al. |
| 2002/0069104 A1 | 6/2002 | Beach et al. |
| 2002/0069109 A1 | 6/2002 | Wendkos |
| 2002/0069158 A1 | 6/2002 | Larkin et al. |
| 2002/0070270 A1 | 6/2002 | Narita et al. |
| 2002/0072931 A1 | 6/2002 | Card |
| 2002/0072974 A1 | 6/2002 | Pugliese et al. |
| 2002/0073019 A1 | 6/2002 | Deaton |
| 2002/0077890 A1 | 6/2002 | LaPointe et al. |
| 2002/0077895 A1 | 6/2002 | Howell |
| 2002/0077904 A1 | 6/2002 | Ali |
| 2002/0077966 A1 | 6/2002 | Harycki et al. |
| 2002/0077978 A1 | 6/2002 | O'Leary et al. |
| 2002/0082920 A1 | 6/2002 | Austin et al. |
| 2002/0082962 A1 | 6/2002 | Farris et al. |
| 2002/0087349 A1 | 7/2002 | Wong |
| 2002/0091567 A1 | 7/2002 | Royston |
| 2002/0099601 A1 | 7/2002 | Farrell |
| 2002/0099649 A1 | 7/2002 | Lee et al. |
| 2002/0107731 A1 | 8/2002 | Teng |
| 2002/0111859 A1 | 8/2002 | Sheldon et al. |
| 2002/0111860 A1 | 8/2002 | Jones |
| 2002/0111861 A1 | 8/2002 | Sakamoto et al. |
| 2002/0111891 A1 | 8/2002 | Hoffman et al. |
| 2002/0116266 A1 | 8/2002 | Marshall |
| 2002/0116331 A1 | 8/2002 | Cataline et al. |
| 2002/0120497 A1 | 8/2002 | King |
| 2002/0120570 A1 | 8/2002 | Loy |
| 2002/0120571 A1 | 8/2002 | Maung et al. |
| 2002/0120846 A1 | 8/2002 | Stewart et al. |
| 2002/0123926 A1 | 9/2002 | Bushold et al. |
| 2002/0123946 A1 | 9/2002 | Haworth et al. |
| 2002/0123955 A1 | 9/2002 | Andreski et al. |
| 2002/0128916 A1 | 9/2002 | Beinecke |
| 2002/0133401 A1 | 9/2002 | Mount et al. |
| 2002/0143614 A1 | 10/2002 | MacLean et al. |
| 2002/0143621 A1 | 10/2002 | Donnelly et al. |
| 2002/0143626 A1 | 10/2002 | Voltmer et al. |
| 2002/0147633 A1 | 10/2002 | Rafizadeh |
| 2002/0147691 A1 | 10/2002 | Davis et al. |
| 2002/0152116 A1 | 10/2002 | Yan et al. |
| 2002/0152118 A1 | 10/2002 | Hadjigeorgis |
| 2002/0152123 A1 | 10/2002 | Giordano et al. |
| 2002/0152179 A1 | 10/2002 | Racov |
| 2002/0161630 A1 | 10/2002 | Kern et al. |
| 2002/0161641 A1 | 10/2002 | Quinlan et al. |
| 2002/0165808 A1 | 11/2002 | Zamsky et al. |
| 2002/0169671 A1 | 11/2002 | Junger |
| 2002/0174011 A1 | 11/2002 | Sanchez et al. |
| 2002/0178056 A1 | 11/2002 | Lim |
| 2002/0178112 A1 | 11/2002 | Goeller et al. |
| 2002/0188478 A1 | 12/2002 | Breeland et al. |
| 2002/0188509 A1 | 12/2002 | Ariff et al. |
| 2002/0188511 A1 | 12/2002 | Johnson et al. |
| 2002/0188565 A1 | 12/2002 | Nakamura et al. |
| 2002/0194071 A1 | 12/2002 | Yoshizaki et al. |
| 2002/0194119 A1 | 12/2002 | Wright et al. |
| 2002/0194126 A1 | 12/2002 | Randell et al. |
| 2002/0198803 A1 | 12/2002 | Rowe |
| 2002/0198807 A1 | 12/2002 | Kobayashi et al. |
| 2003/0004794 A1 | 1/2003 | Hamilton |
| 2003/0004803 A1 | 1/2003 | Glover et al. |
| 2003/0004809 A1 | 1/2003 | Palcic et al. |
| 2003/0005288 A1 | 1/2003 | Moskowitz et al. |
| 2003/0009374 A1 | 1/2003 | Moodie et al. |
| 2003/0009379 A1 | 1/2003 | Narasimhan et al. |
| 2003/0009393 A1 | 1/2003 | Norris |
| 2003/0014372 A1* | 1/2003 | Wheeler et al. ............... 705/71 |
| 2003/0018523 A1 | 1/2003 | Rappaport et al. |
| 2003/0023557 A1 | 1/2003 | Moore |
| 2003/0033252 A1 | 2/2003 | Buttridge et al. |
| 2003/0036952 A1 | 2/2003 | Panttaja et al. |
| 2003/0040964 A1 | 2/2003 | Lacek |
| 2003/0048888 A1 | 3/2003 | Hopper et al. |
| 2003/0050831 A1 | 3/2003 | Klayh |
| 2003/0061093 A1 | 3/2003 | Todd |
| 2003/0061097 A1 | 3/2003 | Walker et al. |
| 2003/0061098 A1 | 3/2003 | Meyer |
| 2003/0065618 A1 | 4/2003 | VanDeBoe, Jr. |
| 2003/0069808 A1 | 4/2003 | Cardno |
| 2003/0083933 A1 | 5/2003 | McAlear |
| 2003/0088462 A1 | 5/2003 | Carrither et al. |
| 2003/0088470 A1 | 5/2003 | Cuervo |
| 2003/0097298 A1 | 5/2003 | Klimpl et al. |
| 2003/0101119 A1 | 5/2003 | Persons et al. |
| 2003/0105688 A1 | 6/2003 | Brown et al. |
| 2003/0105689 A1 | 6/2003 | Chandak et al. |
| 2003/0115100 A1 | 6/2003 | Teicher |
| 2003/0120544 A1 | 6/2003 | Gritzbach et al. |

(56) References Cited

U.S. PATENT DOCUMENTS

| | | |
|---|---|---|
| 2003/0125969 A1 | 7/2003 | Kizer et al. |
| 2003/0126011 A1 | 7/2003 | Bryman et al. |
| 2003/0144902 A1 | 7/2003 | Bowie |
| 2003/0149629 A1 | 8/2003 | Claridge et al. |
| 2003/0158776 A1 | 8/2003 | Landesmann |
| 2003/0158782 A1 | 8/2003 | Thomson et al. |
| 2003/0158818 A1 | 8/2003 | George et al. |
| 2003/0163403 A1 | 8/2003 | Chen et al. |
| 2003/0171992 A1 | 9/2003 | Blagg et al. |
| 2003/0195805 A1 | 10/2003 | Storey |
| 2003/0195843 A1* | 10/2003 | Matsuda et al. ............... 705/39 |
| 2003/0200141 A1 | 10/2003 | Robison |
| 2003/0200142 A1 | 10/2003 | Hicks et al. |
| 2003/0205617 A1 | 11/2003 | Allen et al. |
| 2003/0208400 A1 | 11/2003 | Kuo et al. |
| 2003/0208439 A1 | 11/2003 | Rast |
| 2003/0208441 A1 | 11/2003 | Poplawski et al. |
| 2003/0212630 A1 | 11/2003 | Kahr |
| 2003/0216964 A1 | 11/2003 | MacLean et al. |
| 2003/0216967 A1 | 11/2003 | Williams |
| 2003/0216997 A1 | 11/2003 | Cohen |
| 2003/0216998 A1 | 11/2003 | Chang et al. |
| 2003/0217003 A1 | 11/2003 | Weinflash et al. |
| 2003/0220834 A1 | 11/2003 | Leung et al. |
| 2003/0225618 A1 | 12/2003 | Hessburg et al. |
| 2003/0225619 A1 | 12/2003 | Dokken et al. |
| 2003/0229590 A1 | 12/2003 | Byrne et al. |
| 2003/0233255 A1 | 12/2003 | Dirienzo |
| 2003/0233278 A1 | 12/2003 | Marshall |
| 2003/0233321 A1 | 12/2003 | Scolini et al. |
| 2003/0236712 A1 | 12/2003 | Antonucci et al. |
| 2004/0002916 A1 | 1/2004 | Timmerman et al. |
| 2004/0006487 A1 | 1/2004 | Tari |
| 2004/0010447 A1 | 1/2004 | Asayama |
| 2004/0010462 A1 | 1/2004 | Moon et al. |
| 2004/0015394 A1 | 1/2004 | Mok et al. |
| 2004/0024693 A1 | 2/2004 | Lawrence |
| 2004/0039686 A1 | 2/2004 | Klebanoff |
| 2004/0044606 A1 | 3/2004 | Buttridge et al. |
| 2004/0064401 A1 | 4/2004 | Palaghita et al. |
| 2004/0064436 A1 | 4/2004 | Breslin et al. |
| 2004/0078324 A1 | 4/2004 | Lonnberg et al. |
| 2004/0078328 A1* | 4/2004 | Talbert et al. ............... 705/40 |
| 2004/0078332 A1 | 4/2004 | Ferguson et al. |
| 2004/0078489 A1* | 4/2004 | Anderson et al. ............ 709/245 |
| 2004/0111363 A1 | 6/2004 | Trench et al. |
| 2004/0111371 A1 | 6/2004 | Friedman |
| 2004/0128248 A1 | 7/2004 | Fujihara et al. |
| 2004/0138991 A1 | 7/2004 | Song et al. |
| 2004/0143526 A1 | 7/2004 | Monasterio et al. |
| 2004/0172358 A1 | 9/2004 | Lent et al. |
| 2004/0177036 A1 | 9/2004 | Nutahara et al. |
| 2004/0181441 A1 | 9/2004 | Fung et al. |
| 2004/0186773 A1 | 9/2004 | George et al. |
| 2004/0193540 A1 | 9/2004 | Brown et al. |
| 2004/0199406 A1 | 10/2004 | Owens et al. |
| 2004/0200898 A1 | 10/2004 | Kepecs |
| 2004/0210498 A1 | 10/2004 | Freund |
| 2004/0210531 A1 | 10/2004 | Barron et al. |
| 2004/0215507 A1 | 10/2004 | Levitt et al. |
| 2004/0225628 A1* | 11/2004 | Aoki et al. ............... 706/45 |
| 2004/0230483 A1 | 11/2004 | Kepecs |
| 2004/0236688 A1 | 11/2004 | Bozeman |
| 2004/0243468 A1 | 12/2004 | Cohagan et al. |
| 2004/0243506 A1 | 12/2004 | Das |
| 2004/0245330 A1 | 12/2004 | Swift et al. |
| 2004/0249689 A1 | 12/2004 | Naraki et al. |
| 2004/0249710 A1 | 12/2004 | Smith et al. |
| 2004/0249712 A1 | 12/2004 | Brown et al. |
| 2004/0249764 A1 | 12/2004 | Delitz et al. |
| 2004/0252823 A1 | 12/2004 | Becerra et al. |
| 2005/0004839 A1 | 1/2005 | Bakker et al. |
| 2005/0004864 A1 | 1/2005 | Lent et al. |
| 2005/0006286 A1 | 1/2005 | Fery et al. |
| 2005/0021363 A1 | 1/2005 | Stimson et al. |
| 2005/0021405 A1 | 1/2005 | Agarwal |
| 2005/0021457 A1 | 1/2005 | Johnson et al. |
| 2005/0021853 A1* | 1/2005 | Parekh et al. ............... 709/245 |
| 2005/0023346 A1 | 2/2005 | Bakker et al. |
| 2005/0033637 A1 | 2/2005 | Underwood |
| 2005/0049965 A1 | 3/2005 | Jen |
| 2005/0055270 A1 | 3/2005 | Broe |
| 2005/0065877 A1 | 3/2005 | Cleary et al. |
| 2005/0071225 A1 | 3/2005 | Bortolin et al. |
| 2005/0071226 A1 | 3/2005 | Nguyen et al. |
| 2005/0071227 A1 | 3/2005 | Hammad et al. |
| 2005/0075889 A1 | 4/2005 | Gomes et al. |
| 2005/0080672 A1 | 4/2005 | Courtion et al. |
| 2005/0086103 A1 | 4/2005 | Agura et al. |
| 2005/0086166 A1 | 4/2005 | Monk et al. |
| 2005/0091104 A1 | 4/2005 | Abraham |
| 2005/0091138 A1 | 4/2005 | Awatsu |
| 2005/0096976 A1 | 5/2005 | Nelms |
| 2005/0097033 A1 | 5/2005 | Pretell et al. |
| 2005/0102178 A1 | 5/2005 | Phillips et al. |
| 2005/0102212 A1 | 5/2005 | Roy |
| 2005/0108090 A1 | 5/2005 | Takeda et al. |
| 2005/0108102 A1 | 5/2005 | York |
| 2005/0108151 A1 | 5/2005 | York |
| 2005/0119938 A1 | 6/2005 | Smith et al. |
| 2005/0125292 A1 | 6/2005 | Kassab et al. |
| 2005/0125295 A1 | 6/2005 | Tidwell et al. |
| 2005/0125296 A1 | 6/2005 | Tidwell et al. |
| 2005/0125315 A1 | 6/2005 | Munoz et al. |
| 2005/0125337 A1 | 6/2005 | Tidwell et al. |
| 2005/0125338 A1 | 6/2005 | Tidwell et al. |
| 2005/0125339 A1 | 6/2005 | Tidwell et al. |
| 2005/0125350 A1 | 6/2005 | Tidwell et al. |
| 2005/0125351 A1 | 6/2005 | Tidwell et al. |
| 2005/0125360 A1 | 6/2005 | Tidwell et al. |
| 2005/0131761 A1 | 6/2005 | Trika et al. |
| 2005/0131792 A1 | 6/2005 | Rowe |
| 2005/0137982 A1 | 6/2005 | Michelassi et al. |
| 2005/0144071 A1 | 6/2005 | Monahan et al. |
| 2005/0144074 A1 | 6/2005 | Fredregill et al. |
| 2005/0144105 A1 | 6/2005 | Czyzewski |
| 2005/0144143 A1 | 6/2005 | Freiberg |
| 2005/0149386 A1 | 7/2005 | Agura et al. |
| 2005/0149393 A1 | 7/2005 | Leof |
| 2005/0149440 A1 | 7/2005 | Michelassi et al. |
| 2005/0154664 A1 | 7/2005 | Guy et al. |
| 2005/0159986 A1 | 7/2005 | Breeland et al. |
| 2005/0160003 A1 | 7/2005 | Berardi et al. |
| 2005/0160051 A1 | 7/2005 | Johnson |
| 2005/0167342 A1 | 8/2005 | Vullriede et al. |
| 2005/0171839 A1 | 8/2005 | Corriere |
| 2005/0171842 A1 | 8/2005 | Tien et al. |
| 2005/0171901 A1 | 8/2005 | Rosenblatt et al. |
| 2005/0177503 A1 | 8/2005 | Thomas |
| 2005/0177523 A1 | 8/2005 | Weiss et al. |
| 2005/0182654 A1 | 8/2005 | Abolfathi et al. |
| 2005/0182735 A1 | 8/2005 | Zager et al. |
| 2005/0187820 A1 | 8/2005 | Mohan |
| 2005/0192862 A1 | 9/2005 | Modi |
| 2005/0197904 A1 | 9/2005 | Baron et al. |
| 2005/0199708 A1 | 9/2005 | Friedman |
| 2005/0203824 A1 | 9/2005 | Freud et al. |
| 2005/0203857 A1 | 9/2005 | Friedman |
| 2005/0205666 A1 | 9/2005 | Ward et al. |
| 2005/0209917 A1 | 9/2005 | Anderson et al. |
| 2005/0216346 A1 | 9/2005 | Kusumoto et al. |
| 2005/0222906 A1 | 10/2005 | Chen |
| 2005/0234769 A1 | 10/2005 | Jain et al. |
| 2005/0234773 A1 | 10/2005 | Hirst et al. |
| 2005/0234789 A1 | 10/2005 | Czyzewski et al. |
| 2005/0240474 A1 | 10/2005 | Li |
| 2005/0240477 A1 | 10/2005 | Friday et al. |
| 2005/0242179 A1 | 11/2005 | Warwick |
| 2005/0246289 A1 | 11/2005 | Alexander et al. |
| 2005/0246627 A1 | 11/2005 | Sayed |
| 2005/0251446 A1 | 11/2005 | Jiang et al. |
| 2005/0251470 A1 | 11/2005 | Sullivan |
| 2005/0256794 A1 | 11/2005 | Colby |
| 2005/0256802 A1 | 11/2005 | Ammermann et al. |

(56) References Cited

U.S. PATENT DOCUMENTS

| | | | |
|---|---|---|---|
| 2005/0261916 A1 | 11/2005 | McCall et al. | |
| 2005/0261995 A1 | 11/2005 | Phelan | |
| 2005/0267800 A1 | 12/2005 | Tietzen et al. | |
| 2005/0273386 A1 | 12/2005 | Weidner | |
| 2005/0273387 A1 | 12/2005 | Previdi | |
| 2005/0273425 A1 | 12/2005 | Yamazaki | |
| 2005/0273628 A1* | 12/2005 | Onischuk | 713/186 |
| 2005/0278215 A1 | 12/2005 | Seele, Jr. | |
| 2005/0283429 A1 | 12/2005 | Bates et al. | |
| 2005/0288998 A1 | 12/2005 | Verma et al. | |
| 2005/0289003 A1 | 12/2005 | Thompson et al. | |
| 2006/0004629 A1 | 1/2006 | Neemann et al. | |
| 2006/0010033 A1 | 1/2006 | Thomas | |
| 2006/0010034 A1 | 1/2006 | Sparks | |
| 2006/0011719 A1 | 1/2006 | Lehtonen et al. | |
| 2006/0015463 A1 | 1/2006 | Gupta et al. | |
| 2006/0020507 A1 | 1/2006 | Sagey | |
| 2006/0026073 A1 | 2/2006 | Kenny et al. | |
| 2006/0031718 A1 | 2/2006 | Thornhill et al. | |
| 2006/0036553 A1 | 2/2006 | Gupta et al. | |
| 2006/0064329 A1 | 3/2006 | Abolfathi et al. | |
| 2006/0080230 A1 | 4/2006 | Freiberg | |
| 2006/0080243 A1 | 4/2006 | Kemper et al. | |
| 2006/0080254 A1 | 4/2006 | Chigira et al. | |
| 2006/0085330 A1 | 4/2006 | Imrey et al. | |
| 2006/0085331 A1 | 4/2006 | Imrey et al. | |
| 2006/0085332 A1 | 4/2006 | Imrey et al. | |
| 2006/0085843 A1* | 4/2006 | Onischuk | 726/4 |
| 2006/0095350 A1 | 5/2006 | Hall et al. | |
| 2006/0143077 A1 | 6/2006 | Prorock | |
| 2006/0143117 A1 | 6/2006 | Chigira et al. | |
| 2006/0149671 A1 | 7/2006 | Nix et al. | |
| 2006/0224752 A1* | 10/2006 | Parekh | 709/230 |
| 2007/0094095 A1* | 4/2007 | Kilby | 705/26 |
| 2007/0119919 A1 | 5/2007 | Hogg et al. | |
| 2007/0133768 A1* | 6/2007 | Singh | 379/114.14 |
| 2007/0156581 A1 | 7/2007 | Imrey et al. | |
| 2007/0192249 A1 | 8/2007 | Biffle et al. | |
| 2007/0250392 A1* | 10/2007 | Paulsen et al. | 705/19 |
| 2007/0282674 A1 | 12/2007 | Gomes et al. | |
| 2007/0283171 A1 | 12/2007 | Breslin et al. | |
| 2008/0027841 A1 | 1/2008 | Eder | |
| 2008/0035725 A1* | 2/2008 | Jambunathan et al. | 235/380 |
| 2008/0304431 A1 | 12/2008 | Karaoguz | |
| 2009/0327135 A1* | 12/2009 | Nguyen et al. | 705/44 |
| 2010/0125521 A1 | 5/2010 | Hanan et al. | |
| 2011/0035294 A1* | 2/2011 | Mizrah | 705/26.42 |
| 2011/0258263 A1* | 10/2011 | Murthy et al. | 709/206 |
| 2012/0196568 A1* | 8/2012 | Bakshi | 455/411 |

OTHER PUBLICATIONS

Friedman, Jack, Dictionary of Business Terms (2000).
Forbes, Steve, Fact and Comment, vol. 170, Issue 6 (2000).
Global Corruption Report 2004, Transparency International, Pluto Press, www.globalcorrupt, ISBN 07453 2231, Jun. 26, 2005.
Rial, Astrid, How to Monitor Collectors, Credit Card Management, Jul. 2000, vol. 13, Issue 3, 4 pages.
Keep the Change Savings Service, Bank of America, Retrieved from the internet on Jan. 27, 2006 at <https//www.bankofamerica.com/deposits/checksave/apps/ktc/ktc_terms.cfm>.
Merriam-Websters Collegiate Dictionary, Springfield, Ma., 10th Ed. p. 24 (1997).
Computer Telephony Solutions, The Customer Interaction Specialists, Computer Telephony Solutions, Internet, May 25, 1999.

* cited by examiner

METHOD AND SYSTEM FOR DETERMINING POINT OF SALE AUTHORIZATION

CROSS-REFERENCE TO RELATED APPLICATIONS

This patent application is a Continuation of U.S. patent application Ser. No. 12/966,213 filed Dec. 13, 2010, now U.S. Pat. No. 8,554,631, and claims priority to U.S. Provisional Patent Application No. 61/360,960, filed Jul. 2, 2010, which are hereby incorporated by reference herein in its their entirety.

FIELD OF THE INVENTION

The present invention relates generally to point of sale authorizations, and more specifically to a method and system for providing enhanced point of sale decisions for customers and providers where multiple data types are analyzed and considered in addressing each transaction.

BACKGROUND OF THE INVENTION

Currently, point of sale (POS) systems generally approve all transactions and address fraudulent transactions well after the transaction has been completed. Most merchants will more often than not approve a majority of the transactions. If transactions are declined, they are declined without much intelligence. In determining whether to authorize a transaction, the current systems usually only focus on one factor: the customer's credit for that card, without regard to other factors and considerations. As a result, current systems do not accurately authorize and decline transactions, which result in inefficiencies, approval of fraudulent charges and lost revenue.

Other drawbacks may also be present.

SUMMARY OF THE INVENTION

Accordingly, one aspect of the invention is to address one or more of the drawbacks set forth above. According to an embodiment of the present invention, an automated computer implemented method for determining authorization for a point of sale transaction, wherein the method is executed by a programmed computer processor which communicates with a user via a communication network, comprises the steps of: receiving a point of sale authorization request for a transaction from a customer at a merchant, via a communication network; accessing profile data associated with one or more of the customer, an account associated with the customer and the merchant involved in the transaction; applying one or more rules to the authorization request wherein the one or more rules comprises credit rules and fraud rules; applying one or more scoring algorithm to the authorization request wherein the one or more scoring algorithm indicates an assessment of risk; determining an authorization response, via a programmed computer processor, based at least in part on a combination of profile data, the one or more applied rules and the one or more applied scoring algorithms; providing the authorization response for the transaction via the communication network.

According to an exemplary embodiment of the present invention, an automated computer implemented method and system for determining authorization for a point of sale transaction further comprises: wherein the profile data comprises geographic location of one or more of the customer, the merchant and a card product associated with the customer; wherein the profile data comprises travel advisories and purchase advisories associated with the customer; wherein the one or more scoring algorithm comprises credit risk and fraud risk; wherein the fraud risk is based on one or more of fraud events and fraud trends; wherein the one or more scoring algorithm comprises one or more of profitability, spend utilization and attrition; wherein the authorization response comprises one or more of memo on account, queue for credit review, queue for fraud alert; wherein the authorization response comprises one or more contact customer and flag account for suspected fraud; further comprising the step of generating one or more reports demonstrating decision and action metrics associated with historic POS authorizations; and further comprising the step of storing data associated with the transaction in an authorization log, wherein the data comprises the authorization response.

According to an exemplary embodiment of the present invention, an automated computer implemented system for determining authorization for a point of sale transaction comprises: an interface for receiving a point of sale authorization request for a transaction from a customer at a merchant, via a communication network; a profile module for accessing profile data associated with one or more of the customer, an account associated with the customer and the merchant involved in the transaction; a rules module for applying one or more rules to the authorization request wherein the one or more rules comprises credit rules and fraud rules; a scoring module for applying one or more scoring algorithm to the authorization request wherein the one or more scoring algorithm indicates an assessment of risk; and a decision engine for determining an authorization response, via a programmed computer processor, based at least in part on a combination of profile data, the one or more applied rules and the one or more applied scoring algorithms; and for providing the authorization response for the transaction via the communication network.

BRIEF DESCRIPTION OF THE DRAWINGS

In order to facilitate a fuller understanding of the present inventions, reference is now made to the appended drawings. These drawings should not be construed as limiting the present inventions, but are intended to be exemplary only.

DETAILED DESCRIPTION OF EXEMPLARY EMBODIMENTS

An embodiment of the present invention is directed to an infrastructure to deliver optimal point of sale (POS) decisions for customers and other users. POS decisioning may include the ability to interact with a customer in advance of an authorization request, during the authorization decision process, and subsequent to an authorization decision. Interactions with the customer may occur via various modes of communication, including in-person, merchant location, telephone, Internet, electronic communication, etc. An embodiment of the present invention improves the ability to make more accurate and well informed decisions by providing predictive data and more precise rule sets.

An embodiment of the present invention is able to recognize customer profile data, card product type, merchant data, account data, geographic data and/or other relevant information at the point of sale to provide accurate and comprehensive decisioning. In addition, an embodiment of the present invention analyzes fraud data to recognize fraud trends and other behavior at the point of sale for each transaction. Thus, an embodiment of the present invention may balance the dimensions of credit and fraud risk, customer experience, the cost of delivering an appropriate POS authorization decision and/or other factors—all of which may be dynamic.

An embodiment of the present invention provides greater precision in transaction decisions. A method and system of an embodiment of the present invention may introduce a richer set of data into the decision process (e.g., customer, card and merchant behavior profiles, etc.) Also, better controls and monitoring of strategizes may be realized.

An embodiment of the present invention may create, support, and leverage comprehensive, time-based data views of customers, accounts, merchants, geographies, transactions and/or other data. According to an exemplary embodiment, the system and method may provide tools and processes that allow an entity to manage complex and evolving POS strategies via acts of configuration carried out by business analysts, strategy managers and/or other participants. An embodiment of the present invention may provide the ability to support rich, real-time analysis and reporting tools that inform managers and/or other participants on the health of the POS operating environment and the running performance of executing POS strategies. An embodiment of the present invention may receive inputs and send updates to a variety of source and target data stores and systems and may further incorporate data and notifications from new sources through an integration process.

For example, an embodiment of the present invention may recognize the customer, card and account at the point of sale and make comprehensive intelligent decisions regarding the underlying transaction. In addition, an embodiment of the present invention may also consider merchant data related to the transaction as well as geographic data of the customer, merchant, card, etc. For instance, an embodiment of the present invention may recognize that a particular card present transaction occurred in California and another subsequent card present transaction occurred in New York a short time later (e.g., one hour, etc.) on the same card. The geographic and temporal considerations would mark this transaction as being improbable. In other words, fraud may be likely involved.

According to another example, a customer's behavior may indicate an upcoming trip to Europe for two weeks. This may be evident by the customer's purchase of airline tickets and hotel reservations and/or other behavior. In another example, the customer may provide this information to a system. Using this information, the system of the present invention may deny and/or flag any in person transaction that occurs in the U.S. or other area outside of Europe during the two week period.

Figure 1:
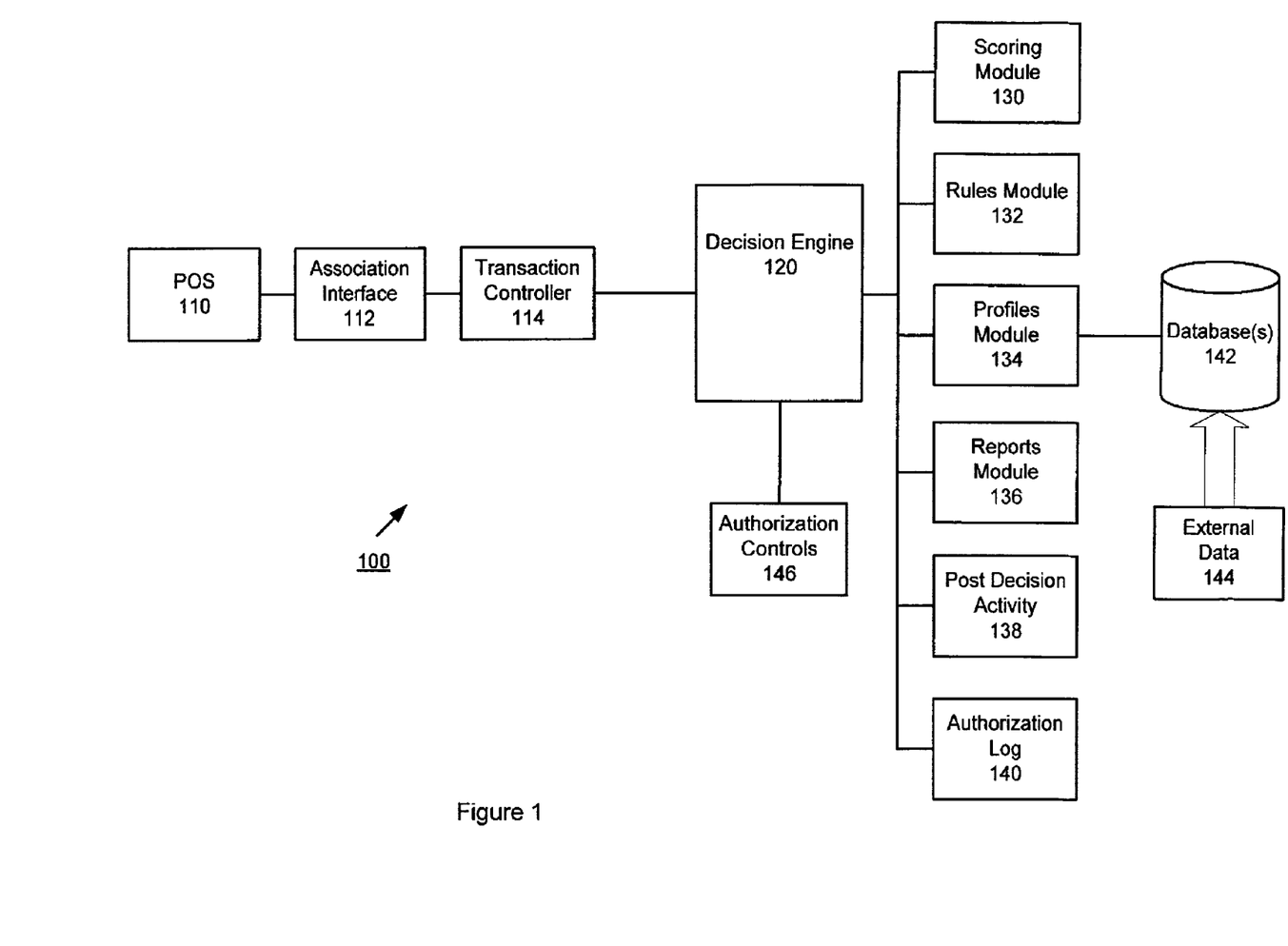
FIG. 1 is an exemplary diagram of a system for processing point of sale authorization requests, according to an embodiment of the present invention.

FIG. 1 is an exemplary diagram of a system for processing point of sale authorization requests, according to an embodiment of the present invention. A system 100 of an embodiment of the present invention may include a Decision Engine 120, which may be stand alone, hosted by an entity, such as a financial institution, service provider, bank, etc. For example, Decision Engine 120 may be affiliated or associated with a financial institution, bank and/or other entity with POS authorization concerns. In an exemplary embodiment involving a financial institution, the financial institution may host or support Decision Engine 120. In this example, POS authorization decisioning in accordance with an embodiment of the present invention may appear to be performed by financial institution, as a single consolidated unit. According to another example, Decision Engine 120 may be separate and distinct from a financial institution. For example, a financial institution, or other entity, may communicate to Decision Engine 120 via a network or other communication mechanism.

Point of Sale 110 may represent a point of sale location, such as a merchant location, online website and/or other purchasing interface. A merchant or other intermediary may transmit an authorization request from Point of Sale 110. An embodiment of the present invention may provide an interface for various transaction sources and controls for which data, scores and rules are applied. Association Interface 112 may receive an authorization message from a card association or other intermediary or even directly from Point of Sale 110. Association Interface 112 may decrypt the message and convert the message to an internal format. Association Interface 112 may manage priority of messages passed to Transaction Controller 114. For example, some messages, such as association authorizations, may have higher priority over other messages, such as pay float. According to another example, POS 110 may communicate directly or indirectly with Decision Engine 120.

Decision Engine 120 may perform various functions, such as data enrichment, basic check execution, complex decisioning, profile update, decision result recordation, post activity request, and/or other functions. Decision Engine 120 may access and communicate directly or indirectly with Scoring Module 130, Rules Module 132, Profiles Module 134, Post Decision Activity Module 136, Authorization Log 140, Database 142, Authorization Controls 146, and/or other modules and/or sources of data. Communication between each representative component may be electronic, wireline, wireless and/or other mode of communication. In addition, Decision Engine 120 may have access to other sources of data and/or data feeds that identify other metrics and/or information that may be relevant for POS authorization decisioning in accordance with the various embodiments of the present invention. While a single illustrative block, module or component is shown, these illustrative blocks, modules or components may be multiplied for various applications or different application environments. In addition, the modules or components may be further combined into a consolidated unit. Other architectures may be realized. The modules and/or components may be further duplicated, combined and/or separated across multiple systems at local and/or remote locations.

Decision Engine 120 may access various sources of information to perform comprehensive decisioning on point of sale authorization requests for transactions. For example, Decision Engine 120 may access and/or maintain Database 142. Database 142 may include data, such as account information, transaction activity, payment activity, and/or other relevant data for one or more accounts. While a single database is illustrated in the exemplary figure, the system may include multiple databases at the same location or separated through multiple locations. The databases may be further combined and/or separated. In addition, the databases may be supported by a financial institution or an independent service provider. For example, an independent service provider may support the one or more databases and/or other functionality at a remote location. Other architectures may be realized. The components of the exemplary system diagrams may be duplicated, combined, separated and/or otherwise modified, as desired by various applications of the embodiments of the present invention as well as different environments and platforms.

An embodiment of the present invention provides data access and integration capabilities of data sources in a batch process, but also in real time processes. The sources of data may range from data warehouse stores, to other operational systems, mainframe or new variables calculated mid authorization stream, but is not limited to this. An embodiment of the present invention may hide details of specific physical data payloads from business functions and allow new data elements to be incorporated, created, and used by POS business functions with rapid deployment, eliminating dependency on integrated technology release management. Incorporation of new data from existing or new sources may also be included.

As illustrated by Scoring Module 130, an embodiment of the present invention provides scoring capabilities that provide assessment of credit risk, fraud risk, profitability, spend utilization, attrition, ability to contact, and/or other values and probabilities. For example, scores may represent an estimate for a prediction, such as probability of fraud or credit default. Scores may by represented by a numerical value or other indication of probability. Any authorization request may involve the invocation of one or multiple scoring functions. Scores produced as outputs by one model or calculation may serve as inputs to a subsequently executed model, calculation or to the rules portion of the decision. Scores related to a particular authorization request may be calculated before, during, or after the authorization response process and in batch, real-time and/or other operational modes. An embodiment of the present invention allows for the rapid deployment of new scoring calculations as well as the easy incorporation of new data elements and sources into the scoring environment.

An embodiment of the present invention may consider fraud data and trends in the POS authorization decisioning process. For example, an embodiment of the present invention may have access to monitoring data related to fraud events and the ability to recognize fraud trends and apply these trends to the decisioning process.

As illustrated by Rules Module 132, an embodiment of the present invention provides a business-friendly environment for the development, testing, and deployment of various business rules and business functions for POS decision strategies. For example, rules may be used for segmentation. Rules may identify what spend level a customer belongs to, payment behavior, transaction type (e.g., card present, card not present), where the customer prefers to shop, types of transactions (e.g., merchant, Internet, restaurants, entertainment, etc.) and/or other segmentation. Also, rules may be applied to scores to translate probability into one or more actions concerning the transaction, such as approve, defer, decline, customer review, other action and/or combination thereof.

Segmentation data produced by rules may be used to identify and avoid fraudulent charges. For example, a merchant may be an Internet only merchant, which means that the merchant only conducts online transactions. If a card present transaction for this particular Internet only merchant shows up on a customer's card, this purchase may indicate a fraudulent activity. In response, an appropriate action may involve flagging or banning all card present transactions at this Internet only merchant. Also, the actions may consider risk assessments. For example, if a possible fraudulent activity is detected, all transactions may be banned at a merchant with high risk whereas all transactions may be approved at a merchant with low risk. For the merchant with low risk, a customer contact for confirmation may be initiated for the approved transactions.

Any given authorization request may utilize rule execution prior to, subsequent to and/or simultaneously with score execution. An embodiment of the present invention may allow rule changes and updates to be applied to the production environment, through a controlled process, on a daily or other basis. Business rules and functions may support arithmetic and logical operators as well as mathematical, statistical, string and/or other functions. Rules may be callable from other rules and it may be possible to invoke multiple rule sets in response to a single authorization. Additionally, rules may initiate actions on operational systems. Targeted actions may include but are not limited to: account blocking, recording information in support of future decisions, queuing a transaction for review by an operational process, initiating customer communication or customer treatments and/or other actions.

As illustrated by Profiles Module 134, an embodiment of the present invention may access profile information, such as customer data, customer preference, card product data, merchant data, account data, geographic information and/or other data. An embodiment of the present invention may provide or be able to leverage a data storage environment capable of hosting operational data profiles representing Account, Customer, Card, Merchant, Customer Geography, and Transaction business entities for use by POS strategies. Profiles may accept updates on time intervals ranging from monthly (e.g., account cycle, etc.) to daily to, in some cases, sub-second (e.g., transactional, etc.).

Profile data may include data related to card, account, customer, merchant, geography, card merchant, account/merchant, account/geographic, non-authorization profile updates, specialty profiles, etc. Customer profile may include variables defined at the customer level including credit line, balance, status, tenure, payment behavior, outstanding authorizations, cash line, cash balance, balance transfer/convenience check (BT/CC) balance, number of cards, product, relationship, customer value, average number of transactions per day, average spend per cycle, max spend per day, max spend per cycle, and other variables.

For example, an embodiment of the present invention may recognize that a single account may be associated with multiple card products, with different account numbers and even different names (e.g., members of a family). POS authorization decisions may consider a customer's card behavior relative to a particular card product as well as other activity associated with other cards and accounts. For example, a customer's card activity may be considered as well as the customer's spouse's activity on a different card product and/or other cards associated with the account (e.g., daughter's debit card, etc.).

Various identifiers, such as card number, zip code, merchant name, merchant ID and/or other data may be used to identify associated profiles and authorization controls. For example, a card number may be used to identify customer's card, type of card, account and customer profiles. Zip code may be used to identify a geography profile. Merchant name and/or identifier may be used to access a merchant profile. Intersection profiles, such as card/merchant, card/geography, may also be identified. For example, a card/geography interaction profile may consider where a card has been used and relevant activity in that particular location. In this example, whether the card has been used in a particular geographic location may be considered. A risk assessment may be performed or determined on the geographic location. For example, a customer may reside in Delaware. It may be determined by his profile and other data that he does not travel beyond the east coast. If a card present transaction is detected in California, an embodiment of the present invention may determined that this particular card has never been to California. It may also determined that the merchant in California involved in the transaction has a higher than normal fraud rate. With these factors in consideration, an embodiment of the present invention may then determine an appropriate action, such as deny and/or flag the potential fraudulent activity. Associated records from authorization control tables may also be identified, such as yellow flags, travel advisories, purchase advisories, safe zones, guaranteed approval, etc.

An embodiment of the present invention may focus on the card and track where it is being used. This data may be used to create and/or refine a customer's profile data. For example, a customer residing in 12345 zip code may use the card at a particular restaurant. By applying a fraud rule, the system may recognize that other customers living in that same zip code also dine at that restaurant and thereby deem those transactions valid. The system may continue to monitor the customer's behavior and continue to approve transactions within the recognized zip code. If transactions start showing up in other locations, those transactions may be flagged or declined. As the system develops and refines the customer's profile, the system may recognize that the customer visits family two hours away each month. The system may recognize this as a safe zone and authorize all transactions in that area during the recognized time frame. The system may also recognize that families travel more often during the summer months when school is out of session. So, for the summer months, the system will approve more transactions outside the local zip code. Also, the system may recognize that the customer travels to San Francisco every August. Accordingly, these transactions will be authorized in this location during the travel time period. According to another example, an embodiment of the present invention may recognize business travels where the customer makes travel and hotel arrangements for himself or herself, without additional family members. Also, a customer may have a designated business card product for business purchases. An embodiment of the present invention may recognize that different geographies are more likely for business travel as opposed to personal travel. Accordingly, those business related purchases will more likely be approved, even if occurring in various geographic locations. Other variations and applications may be applied.

An embodiment of the present invention may view data that could have been used to decision an authorization at the time of processing, not just the data that was actually used by the rules sets that were executed. Capturing all the data as part of the decision log permits an embodiment of the present invention to easily simulate the impact of new rules and scores.

Database 142 may support a complete record of data used to process an authorization request or other decision type as well as a complete trace of rules and scores used in the process. Information captured and retained as the result of an authorization decision may be available for use by analytic and operational processes. Database 142 may also receive External Data 144 from various sources. While a single block is shown, external data may represent multiple sources of data. For example, Database 142 may receive good indicators, bad indicators as well as neutral indicators. Good indicators may include recency of payments, time passed with no fraudulent activities, etc. Bad indicators may include fraud reported by customers, lack of payment from customer, missed or late payments, loss of income, etc. Other data may include fraud occurring elsewhere, notifications from merchants, police reports, credit bureau reports, reports from other entities (e.g., issuers, loan agencies, etc.), macro economic data (e.g., state of unemployment, stock market, etc.) and/or other data. Data from financial institutions may also be used. For example, a customer may have an automatic deposit with an employer twice a month. If the automatic deposit has been terminated, the customer's credit default risk may increase. Partner data from various entities (e.g., travel and entertainment agencies) may also be received. This data may be used to identify travel patterns and other customer behavior data.

As illustrated by Reports Module 136, an embodiment of the present invention may provide and/or support real-time dashboards, standard reports, and ad hoc queries and reports that present metrics on the overall health and performance of the technical operating environment as well as the decision and action metrics of executing POS strategies. Dashboard, reporting, and query capabilities may be accessible by a broad range of analytic and operational stakeholders including IT, Strategy Management, Marketing and/or other entities. The Management Information System (MIS) metrics set may be extensible via business configuration or development processes. An embodiment of the present invention may support high-level summarization and drill-down across a configurable range of dimensions and filters including but not limited to customer, account, product, business unit, transaction type, merchant and/or other factors. An embodiment of the present invention may support temporal aggregation intervals ranging from seconds through minutes, hours, days, weeks, and months to yearly aggregations. An embodiment of the present invention may also provide an environment that allows business strategy managers to define Event Detection Rules that may be monitored and enforced by the Analytic Data Storage environment and then communicated to the Decision Engine environment for handling by POS strategies and rules. Defined events to be supported may include customer spending outside of normal geographic and merchant footprints, spending velocity pattern changes, and other "out-of-band" behaviors that may be defined over Customer, Account, and/or Merchant data footprints.

A user may access the Reports Module 136 via a user interface. Reports and other outputs may be transmitted via wireless communication to remote devices. Users may program and execute customized reports on a periodic basis or by request. Other variations and implementations may be realized.

Post Activity Module 138 may provide various actions for execution. Exemplary actions may include the following: memo on account, queue for credit review, queue for fraud review, contact customer, flag the account for suspected fraud, e.g., yellow flag, trigger an alert, etc.

Authorization Log 140 may store authorization history data and track decisions made by Decision Engine 120. For some transactions, Decision Engine 120 may access Authorization Log 140 to perform comparisons to attributes of current transactions. This may be particularly relevant to Velocity and Distance checks. Velocity may refer to the frequency of spend over a given period of time for similar transactions. For Velocity checks, an embodiment of the present invention may look for matches with current authorization. For example, multiple transactions of the same type at a high volume may indicate potential fraudulent behavior, such as purchasing ten plasma televisions within a 4 hour window. The rules may provide what types of matches to make, based on logic that was coded, e.g., match by merchant, MCC, POS entry mode, amount rage, etc. Distance may refer to the distance of the current transaction from the last transactions. For Distance checks, an embodiment of the present invention may return the sequence of zip codes for the requested time period. For example, an embodiment of the present invention may flag a transaction made in New York and a subsequent transaction made in California within a short time frame, such as 4 hours, for fraud based on the location and time between transactions.

Once a decision has been returned, various data, including logs, profiles, etc., may be updated through Authorization Controls 146.

According to another embodiment of the present invention, Decision Engine 120 may host a website or other electronic interface, where users may access data as well as provide data. For example, a financial institution, merchant and/or other entity may access information through an interface to view data, submit requests, provide data and/or perform other actions.

Figure 2:
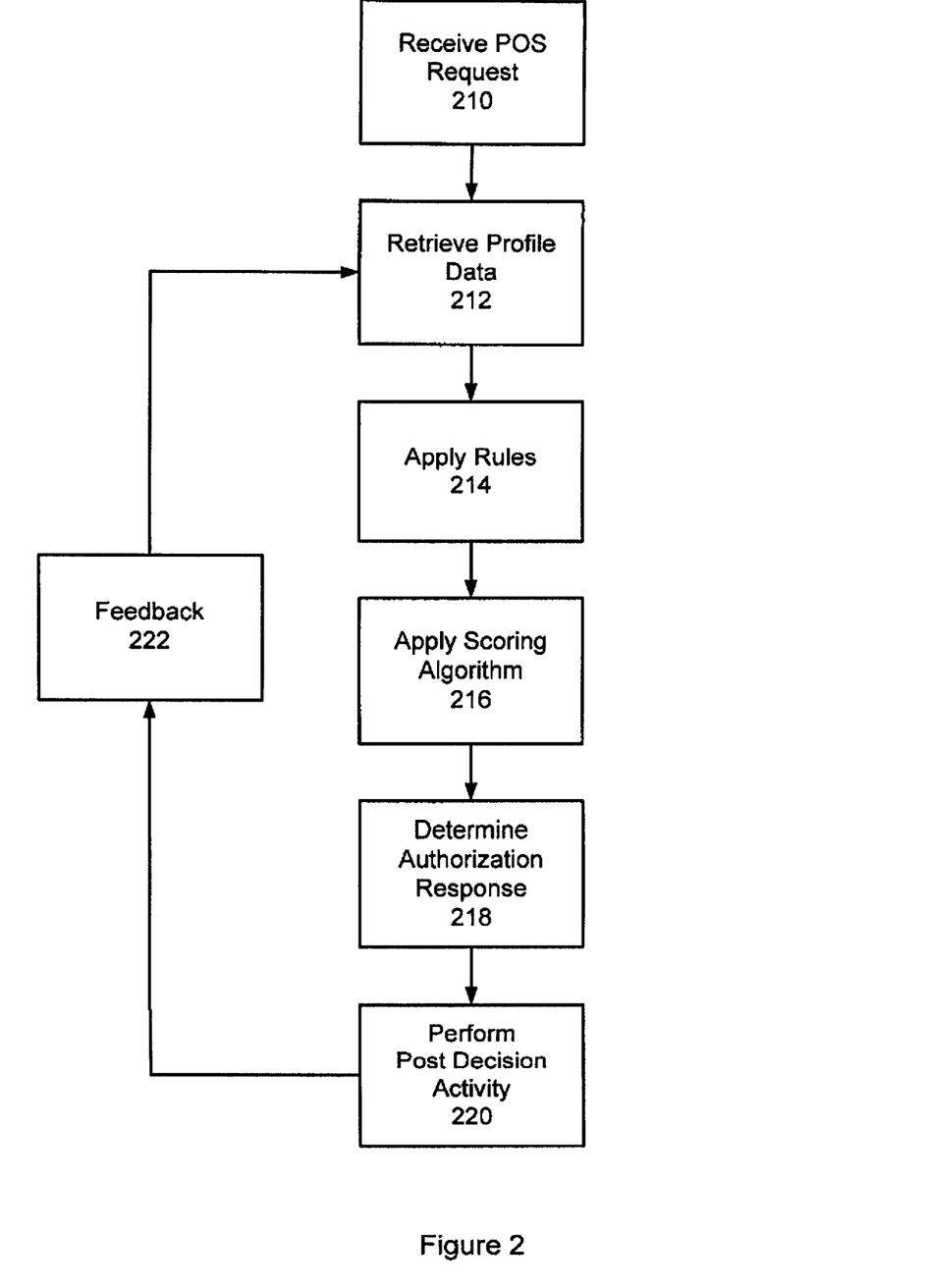
FIG. 2 is an exemplary flowchart illustrating a method for processing point of sale authorization requests, according to an embodiment of the present invention.

FIG. 2 is an exemplary flowchart illustrating a method for processing point of sale authorization requests, according to an embodiment of the present invention. At step 210, a POS authorization request may be received from a merchant or other entity. At step 212, profile data may be retrieved in response to the POS authorization request. At step 214, one or more rules may be applied. At step 216, one or more scoring algorithms may be applied. At step 218, an authorization response may be determined. At step 220, post decision activity may be performed. Also, feedback loop 222 may be implemented to further revise and refine profile data and/or other information. The order illustrated in FIG. 2 is merely exemplary. While the process of FIG. 2 illustrates certain steps performed in a particular order, it should be understood that the embodiments of the present invention may be practiced by adding one or more steps to the processes, omitting steps within the processes and/or altering the order in which one or more steps are performed. These steps will be described in greater detail below.

At step 210, a POS authorization request may be received from a merchant or other entity. The authorization request may be received from merchant location or other location for making a transaction.

At step 212, profile data may be retrieved in response to the POS authorization request. Profile data may include data associated with the customer, account and merchant. Other profile data may include geographic data indicating where the transaction is taking place as well as where the customer is currently located.

At step 214, one or more rules may be applied. Rules may include credit rules and fraud rules. An embodiment of the present invention may considers both credit and fraud factors in authorizing a transaction. For example, rules may identify segmentation data, such as customer spend data, transaction type, payment behavior, etc. While Apply Rules step 214 is illustrated in this exemplary diagram as occurring before Apply Scoring Algorithm step 216, step 214 can occur after, before or even concurrently with step 216. Other variations in the order of the steps illustrated in FIG. 2 may be realized.

At step 216, one or more scoring algorithms may be applied. The scoring algorithms may represent the risk involved in the transaction, such as fraud, credit default and/or other risk associated with a transaction. Other risk may include profitability, spend utilization, attrition and other types of risk.

At step 218, an authorization response may be determined. Based on the comprehensive data, an embodiment of the present invention may make a well decisioned determination for the POS authorization request. For example, profile data, including customer data, account data, merchant data and/or other data may considered. Risk assessment, including likelihood for fraud and/or credit default, may be considered in how to authorize a transaction. Other external sources of data may also be involved in determining POS authorization.

At step 220, post decision activity may be performed. Additional research and reporting may be performed, for example. In addition, the output may be considered in revising the rules and algorithms discussed above. A feedback loop may be implemented at step 222. For example, the customer's profile may be updated. If the customer is not fitting a certain profile or model, a customer contact may be initiated to arbitrate a questionable transaction. Based on the customer feedback, the customer's profile may be updated. According to another example, a customer questionnaire may be forwarded or requested to gather more accurate information.

While the exemplary embodiments illustrated herein may show the various embodiments of the invention (or portions thereof) collocated, it is to be appreciated that the various components of the various embodiments may be located at distant portions of a distributed network, such as a local area network, a wide area network, a telecommunications network, an intranet and/or the Internet, or within a dedicated object handling system. Thus, it should be appreciated that the components of the various embodiments may be combined into one or more devices or collocated on a particular node of a distributed network, such as a telecommunications network, for example. As will be appreciated from the following description, and for reasons of computational efficiency, the components of the various embodiments may be arranged at any location within a distributed network without affecting the operation of the respective system.

Data and information maintained by Decision Engine 120 may be stored and cataloged in Database 142 which may comprise or interface with a searchable database. Database 142 may comprise, include or interface to a relational database. Other databases, such as a query format database, a Standard Query Language (SQL) format database, a storage area network (SAN), or another similar data storage device, query format, platform or resource may be used. Database 142 may comprise a single database or a collection of databases, dedicated or otherwise. In one embodiment, Database 142 may store or cooperate with other databases to store the various data and information described herein. In some embodiments, Database 142 may comprise a file management system, program or application for storing and maintaining data and information used or generated by the various features and functions of the systems and methods described herein. In some embodiments, Database 142 may store, maintain and permit access to customer information, transaction information, account information, and general information used to process transactions as described herein. In some embodiments, Database 142 is connected directly to Decision Engine 120, which, in some embodiments, it is accessible through a network, such as communication network, for example.

Communications network may be comprised of, or may interface to any one or more of, the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, a V.34 or a V.34bis analog modem connection, a cable modem, an Asynchronous Transfer Mode (ATM) connection, a Fiber Distributed Data Interface (FDDI) connection, or a Copper Distributed Data Interface (CDDI) connection.

Communications network may also comprise, include or interface to any one or more of a Wireless Application Protocol (WAP) link, a General Packet Radio Service (GPRS) link, a Global System for Mobile Communication (GSM) link, a Code Division Multiple Access (CDMA) link or a Time Division Multiple Access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based radio frequency link. Communications network 107 may further comprise, include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

In some embodiments, communication network may comprise a satellite communications network, such as a direct broadcast communication system (DBS) having the requisite number of dishes, satellites and transmitter/receiver boxes, for example. Communications network may also comprise a telephone communications network, such as the Public Switched Telephone Network (PSTN). In another embodiment, communication network 120 may comprise a Personal Branch Exchange (PBX), which may further connect to the PSTN.

In some embodiments, Decision Engine 120 may include any terminal (e.g., a typical home or personal computer system, telephone, personal digital assistant (PDA) or other like device) whereby a user may interact with a network, such as communications network that is responsible for transmitting and delivering data and information used by the various systems and methods described herein. Decision Engine 120 may include, for instance, a personal or laptop computer, a telephone, or PDA. Decision Engine 120 may include a microprocessor, a microcontroller or other general or special purpose device operating under programmed control. Decision Engine 120 may further include an electronic memory such as a random access memory (RAM) or electronically programmable read only memory (EPROM), a storage such as a hard drive, a CDROM or a rewritable CDROM or another magnetic, optical or other media, and other associated components connected over an electronic bus, as will be appreciated by persons skilled in the art. Decision Engine 120 may be equipped with an integral or connectable cathode ray tube (CRT), a liquid crystal display (LCD), electroluminescent display, a light emitting diode (LED) or another display screen, panel or device for viewing and manipulating files, data and other resources, for instance using a graphical user interface (GUI) or a command line interface (CLI). Decision Engine 120 may also include a network-enabled appliance, a browser-equipped or other network-enabled cellular telephone, or another TCP/IP client or other device.

As described above, FIG. 1 shows embodiments of a system of the invention. The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example. As described herein, a module performing functionality may comprise a processor and vice-versa.

As noted above, the processing machine used to implement the invention may be a general purpose computer. However, the processing machine described above may also utilize any of a wide variety of other technologies including a special purpose computer, a computer system including a microcomputer, mini-computer or mainframe for example, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the process of the invention.

It is appreciated that in order to practice the method of the invention as described above, it is not necessary that the processors and/or the memories of the processing machine be physically located in the same geographical place. That is, each of the processors and the memories used in the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; e.g., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, ROM Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

Further, although the embodiments of the present inventions have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breadth and spirit of the embodiments of the present inventions as disclosed herein.

The invention claimed is:

1. An automated computer implemented method for determining authorization for a transaction based on a merchant profile, wherein the method is executed by a decision engine comprising one or more computer processors which communicates with a user via a communication network, the method comprising the steps of:

receiving an authorization request for a transaction from a customer at a merchant location, via a communication network;

accessing a customer profile associated with the customer, from a computer database containing customer profile data and merchant profile data wherein a customer profile is associated with a particular customer and wherein a merchant profile is associated with a particular merchant, wherein the merchant profile comprises a merchant behavior profile, a merchant type, and a geographic location of the merchant;

accessing, from the computer database, a merchant profile associated with a merchant involved in the transaction;

executing, with the decision engine, one or more rules to the authorization request wherein the one or more rules generate merchant segmentation data to identify potentially fraudulent activity;

executing, with the decision engine, one or more scoring algorithms to the authorization request wherein the one or more scoring algorithms indicate an assessment of risk;

performing, with the decision engine, a velocity check to the transaction wherein the velocity check refers to a frequency of spend over a period of time for similar transactions for the merchant;

performing, with the decision engine, a distance check to the transaction wherein the distance check refers to a distance between a current transaction and a previous transaction;

in response to the customer profile data, the merchant profile, the merchant segmentation data, the assessment of risk, the frequency of spend and the distance check, automatically determining, with the decision engine, an authorization response; and transmitting the authorization response for the transaction via the communication network.

2. The method of claim 1, wherein the merchant location comprises an online website.

3. The method of claim 1, wherein the merchant profile comprises an intersection profile with a card profile to determine at which merchants the card has been used.

4. The method of claim 1, wherein the velocity check is applied to the same merchant.

5. The method of claim 1, further comprising the step of: applying a feedback loop to update the merchant profile.

6. The method of claim 1, wherein the merchant profile data comprises one or more fraud indicators.

7. The method of claim 1, wherein the one or more scoring algorithm comprises credit risk and fraud risk; wherein the fraud risk is based on one or more of fraud events and fraud trends.

8. The method of claim 1, wherein the one or more scoring algorithm comprises one or more of profitability, spend utilization and attrition.

9. The method of claim 1, wherein the authorization response comprises one or more of memo on account, queue for credit review, queue for fraud alert.

10. An automated computer implemented system for determining authorization for a transaction based on a merchant profile, the system comprising:

a computer database containing customer profile data and merchant profile data wherein a customer profile is associated with a particular customer and wherein a merchant profile is associated with a particular merchant, wherein the merchant profile comprises a merchant behavior profile, a merchant type, and a geographic location of the merchant and a decision engine, which decision engine comprises one or more computer processors and is coupled to the computer database and programmed to:

receive an authorization request for a transaction from a customer at a merchant location, via a communication network;

access, from the computer database, a customer profile associated with the customer;

access, from the computer database, a merchant profile associated with a merchant involved in the transaction;

execute one or more rules to the authorization request wherein the one or more rules generate merchant segmentation data to identify potentially fraudulent activity;

execute one or more scoring algorithms to the authorization request wherein the one or more scoring algorithms indicate an assessment of risk;

perform a velocity check to the transaction wherein the velocity check refers to a frequency of spend over a period of time for similar transactions for the merchant;

perform a distance check to the transaction wherein the distance check refers to a distance between a current transaction and a previous transaction;

in response to the customer profile data, the merchant profile, the merchant segmentation data, the assessment of risk, the frequency of spend and the distance check, automatically determine an authorization response for the transaction, with the decision engine; and transmit, using the communication network, the authorization response to the authorization request for the transaction.

11. The system of claim 8, wherein the merchant location comprises an online website.

12. The system of claim 8, wherein the merchant profile comprises an intersection profile with a card profile to determine at which merchants the card has been used.

13. The system of claim 8, wherein the velocity check is applied to the same merchant.

14. The system of claim 8, wherein the instructions operable to cause the one or more processors to perform operations further comprise:

applying a feedback loop to update the merchant profile.

15. The system of claim 8, wherein the merchant profile data comprises one or more fraud indicators.

16. The system of claim 8, wherein the one or more scoring algorithm comprises credit risk and fraud risk; wherein the fraud risk is based on one or more of fraud events and fraud trends.

* * * * *